May 28, 1929.  H. MASON ET AL  1,715,301
ENDLESS CORD CONVEYER
Filed Dec. 31, 1927  3 Sheets-Sheet 1
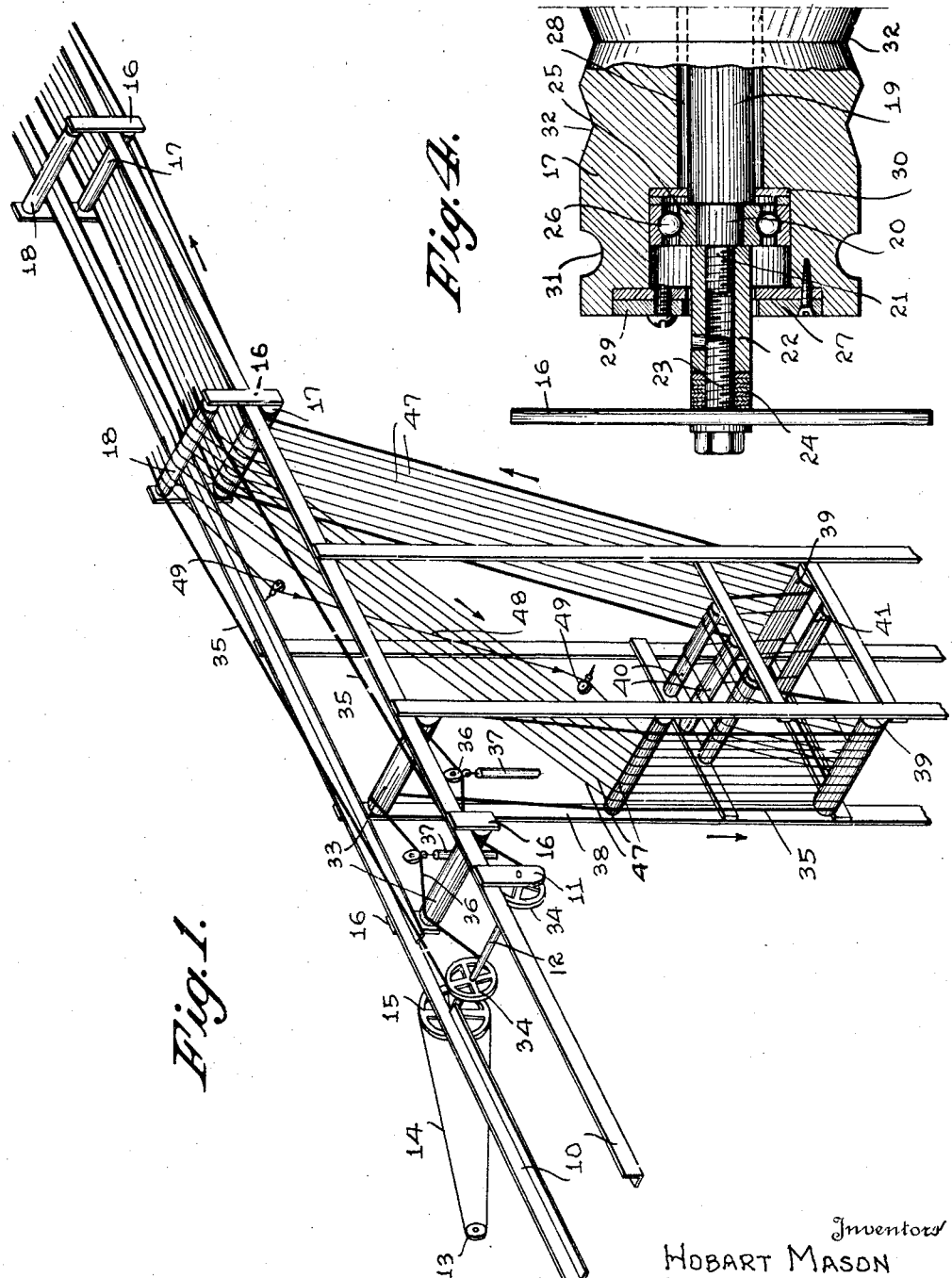
Inventors
HOBART MASON
BRUCE BEARDSLEY
PAUL J. BIRKMEYER
Eugene E. Brown
Attorney

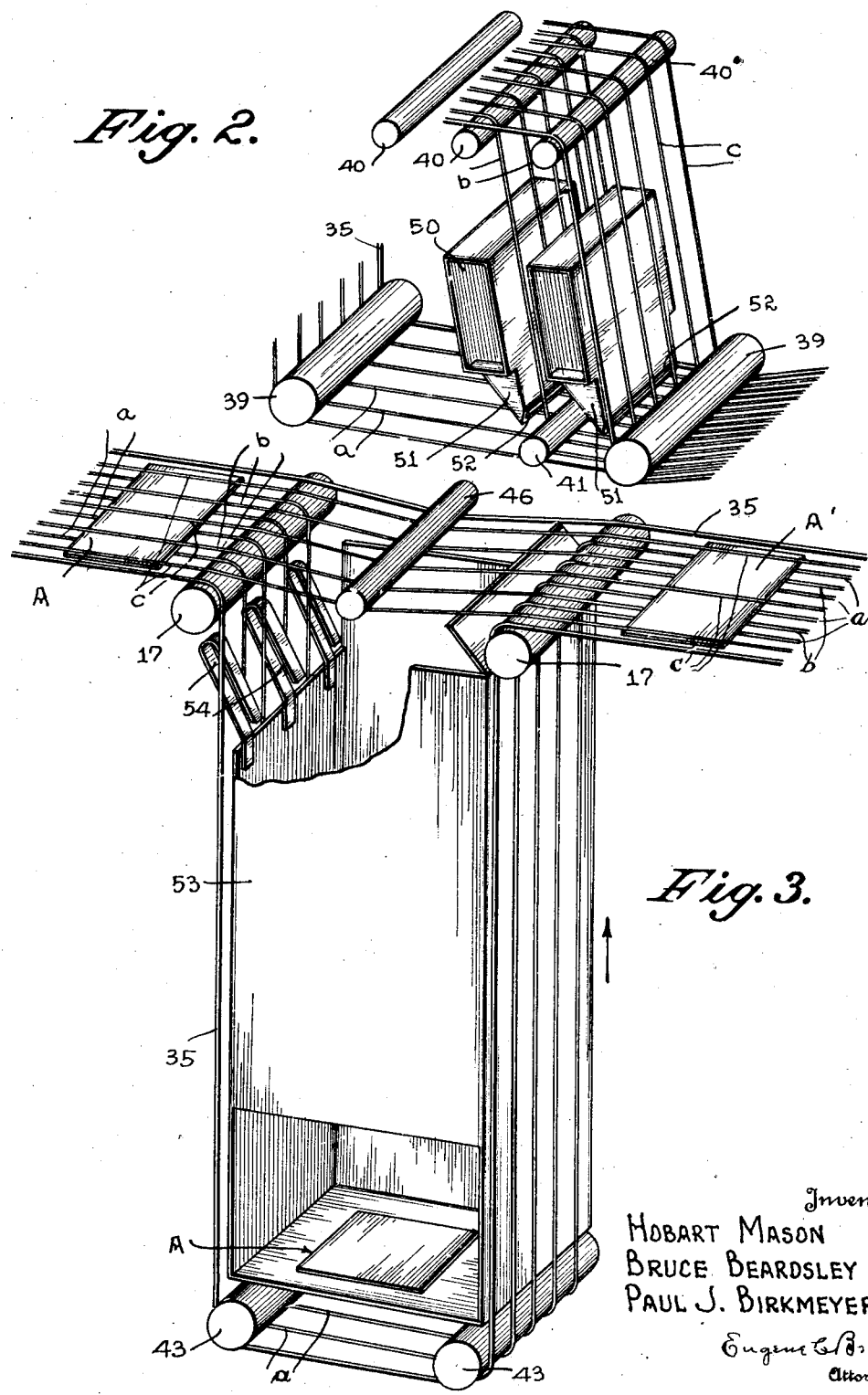

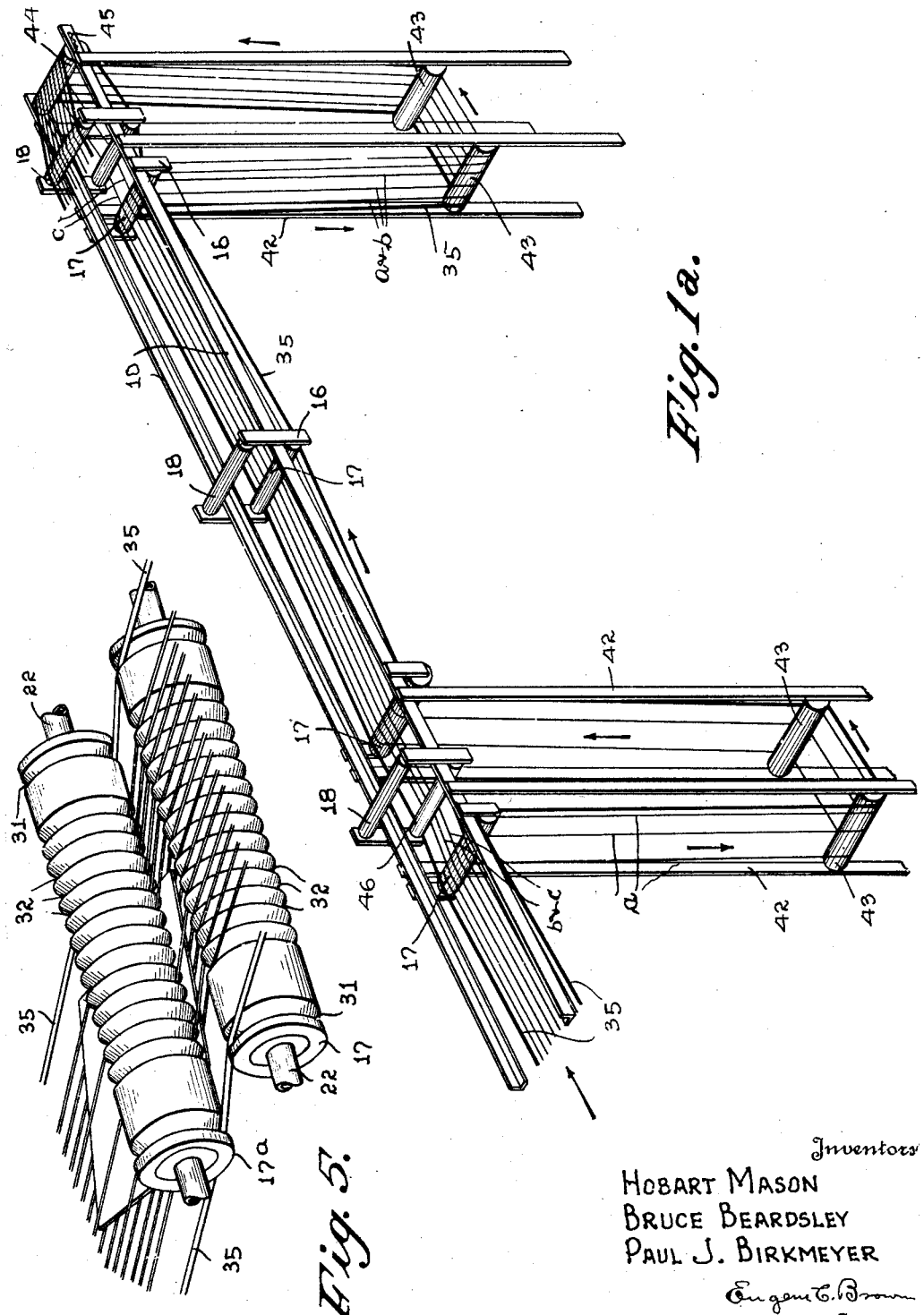

Patented May 28, 1929.

1,715,301

UNITED STATES PATENT OFFICE.

HOBART MASON, OF WESTFIELD, NEW JERSEY, AND BRUCE BEARDSLEY AND PAUL J. BIRKMEYER, OF BROOKLYN, NEW YORK, ASSIGNORS TO THE WESTERN UNION TELEGRAPH COMPANY, OF NEW YORK, N. Y., A CORPORATION OF NEW YORK.

ENDLESS-CORD CONVEYER.

Application filed December 31, 1927. Serial No. 243,928.

This invention relates to conveyers and has special reference to an endless belt type of conveyer particularly adapted for handling flat parcels or packages such as letters, telegrams and other articles of the same general form.

Among the objects of the present invention are to provide a conveyer wherein the conveying belt is formed by a series of parallel strands similar to the warp strands in weaving cloth, the conveyer being provided at intervals with means whereby the strands are separated to form "sheds" like the "shed" of a loom, for the insertion and discharge of the articles; to provide a form of belt conveyer wherein articles may be sent from a sending station to any one of several receiving stations at the desire of the sender, the conveyed articles being securely gripped between the cords, ropes, or other flexible strands of like character; to provide means in such a conveyer whereby the conveyer strands will be relieved from the tension common to the belts of belt conveyers and to provide means whereby the conveyer strands may be formed from a single length of endless cord, rope or the like.

With the above and other objects in view the invention will now be specifically described in connection with the accompanying drawings, wherein:

Figure 1 is a perspective view of a portion of such a conveyer.

Figure 1a is a perspective view of a continuation of the conveyer shown in Figure 1.

Figure 2 is a detail perspective view to a large scale of one form of article receiving device associated with the conveyer for the purpose of placing articles in position for conveying.

Figure 3 is a detail perspective view of a form of article delivering station arranged to deliver articles from the conveyer and catch the delivered articles.

Figure 4 is a detail view partly in section through one of the conveyer rollers employed in connection with this invention.

Figure 5 is a perspective view of a pair of rollers which coact to maintain the cords in proper position during the passage of a message blank or other article being transported.

In the embodiment of the invention herein illustrated the conveyer proper is shown as consisting of a pair of angle-iron side members or rails 10 and secured to these members adjacent one of the conveyers are bearings 11 wherein is journaled a drive shaft 12 driven by any suitable means such as is here indicated by the pulley 13 and belt 14 connecting said pulley operatively with a pulley 15 fixed on the shaft 13. At intervals along the side rails 10 are bearings or hangers 16 which support lower rollers 17 and upper rollers 18. These rollers in the general views are typically indicated as ordinary cylinders but it is preferred that these rollers be of the construction shown in Figure 4 and supported in the manner there shown. It will be seen by reference to this figure that between the hangers 16 extends a shaft 19 having at each end a shouldered portion 20 and provided with a terminal threaded portion 21 whereon is screwed a sleeve 22 which is carried by a bolt 23 passing through the respective hanger 16, suitable washers 24 being interposed between the sleeve and hanger. Fitted on the reduced portion 20 is the inner race 25 of a ball bearing 26, the ball bearing having its outer race fitted in a recess 27 formed in the end of the bearing roller 17. Furthermore, the bearing roller has a central opening 28 through which the shaft 19 passes in such manner that the shaft is free from the roller 17. Dust plates or washers 29 and 30 are provided for the protection of the ball bearing. Adjacent each end of each roller is a circumferential semi-circular groove 31 and spaced along the rollers are flat V-shaped circumferential grooves 32.

At the driving end of the conveyer there is also provided a pair of rollers 33 which are similar to those just described but which may have the intermediate grooves 32 omitted. On the shaft 12 is a pair of grooved pulleys 34 and endless cables 35 are trained around these grooved pulleys and pass over the rollers 17 and 18, being engaged in the grooves 31 of said rollers. Between the rollers 33 each of the cables 35 has mounted thereon an idler pulley 36 from which is suspended a weight 37 for the purpose of keeping the cables or strands 35 in tension. These cables 35 constitute the driving means for all of the rollers which are used in this conveyer and perform no part in the conveying of articles other than the driving of the conveyer.

Depending below the side rails 10 at the driving end of the conveyer in Figure 1 there is shown a frame 38 and adjacent the part of this frame at the front and rear thereof are grooved rollers 39 of the same character as the other rollers. Above these rollers 39 are arranged other rollers 40 and between the rollers 39 with its lower part in the same plane as the lower parts of the rollers 39 is a roller 41. At the opposite end of the conveyer is a second frame 42 wherein are supported rollers 43 and adjacent the upper part of this frame is an end roller 44 adjustably mounted for tension in slots 45 in the side frames 10. There may also be, intermediate the ends of the conveyer, other frames 42 having rollers 43 and at the top of each of these frames are positioned certain of the lower rollers 17 between which operates a supplementary lower roller 46. In the formation of the conveyer element proper a single length of rope, or cord is taken and starting from the driving end of the conveyer this rope is carried down and around beneath the rollers 39 thence upwardly and over the first roller 17 and alternately under and over the rollers 17, the rope always running below the rollers 46. The rope is then carried around the roller 44 and back over the top of the roller 18 to the first roller 39, this operation being repeated until all of the grooves 32 have been filled which will bring the last end of the rope on the opposite side of the conveyer to the starting end, the rope being then carried across the conveyer and joined to the starting end. These convolutions of the rope or cord are indicated by lines 47 while the diagonal portion is indcated in Figure 1 at 48. Suitable tensioning means 49 is provided to keep a light tension on these strands. Preferably the winding is done in this manner so that tension on all strands may be uniform but, as will presently appear, the various runs or leads of the rope might be by separate endless belts without in any way affecting the method of operation of the invention.

Now while the description of the manner in which the rope is lead around the pulleys illustrates the general arrangement, yet at each of the delivery and receiving stations this arrangement is somewhat modified. Certain of the leads or strands on arriving at these stations are carried down so as to pass around the rollers 43 while others are carried across beneath the roller 46 at that station. In the receiving station in like manner either of the strands or leads are carried down while others are carried across and in such receiving stations after the strands are carried down they are then carried up over the first roller 40, some of them being carried down from the second roller under the roller 41 and others down from the third roller 40 under the remaining roller 39. While in Figure 1 there has been shown but three of the rollers 40 and but one roller 41, it is not to be understood that the device is limited to this number but is merely illustrative of an arrangement suitable for receiving packages to be delivered at two different stations. If the packages are to be delivered at more than two stations the number of rollers 40 and 41 is correspondingly increased, the idea being that as the cords or strands pass over the rollers 40 they are lead downwardly in a number of groups corresponding to the number of receiving stations to be served. Thus the cords or strands that pass downwardly from the second or middle roller 40 form one group and the cords or strands that pass downwardly in the present instance from the third roller 40, form another group corresponding to the two stations shown in Figure 1ª. At the delivery stations shown in Figure 1ª also certain of the strands lead down around the rollers 43 and in this instance the strands which lead down are the same as those which lead down from the corresponding roller 40 at the receiving station. It is likewise to be noted that while there is but one receiving station shown in the present instance any number of such stations may be arranged along the conveyer.

Now for the purpose of understanding how this shifting of the cords or strands which forms an arrangement corresponding to the "shed" of a loom, enables selective delivery to be accomplished, attention is called particularly to Figures 2 and 3, wherein Figure 2 illustrates the receiving station construction and Figure 3 a delivery station construction. Now in Figure 2, it will be seen that the alternate strands of the upper part of that figure are lead over respective rollers 40, the strands passing over the middle roller 40, passing under the roller 41 and then under the roller 39. Also the remaining strands of the conveyer come down and pass under the other roller 39. Thus all of the strands passing from the first roller 39 lie in the same plane, after having been moved out of their normal plane. At points adjacent the rollers 41 and 39 where the displaced strands resume their normal relation with the remaining strands, there are provided a plurality of receiving boxes 50 having delivery nozzles 51 provided with slots 52, which are positioned so that articles placed in these boxes are delivered in such manner that they fall on the strands which are following their normal path, as for instance, the strands $a$, and are gripped either between these strands and strands $b$ and $c$ if the articles are placed in the left hand box or between the strands $a$ and $b$ and the strands $c$ if the articles are placed in the right hand box in Figure 2. Thus the same strands eventually grip all the articles by their relative positions above and below the article, which as may be seen in Figure 3, varies in accordance with their relative arrangement in passing over the rollers 40. At each of the delivery stations a suitable receptacle 53 is provided having guide fingers 54 at its upper part which project between the strands as they pass downward over the roller 17. Now by inspection of this figure it will be seen that the same strands $b$ and $c$ which pass over the middle roller and end roller 40 lie above the article A at the left of Figure 3 while the strands $a$ of this figure lie under this article. For delivery at the station shown in Figure 3 it is the strands $a$ which are deflected downwardly to open up the "shed" and are carried beneath the rollers 43 and thence upwardly to again lie in the plane common to all strands. At the same time the article A′ will have a different arrangement of the strands $a$, $b$ and $c$, so that in the conveying of this article it will be supported by the strands $b$ in passing across beneath the roller 46, the article A′ thus passing over the receptacle 53 while the article A will drop into such receptacle. Obviously the station at which the article A′ is delivered must have the downwardly extending strands so arranged that all of those which lie beneath the article A′ will be deflected downwardly while those lying above will be carried straight across. Thus by varying the under and over relation of the strands and the deflecting or "shed-forming" device, articles may be delivered from a sending station to any one of a number of receiving stations, the number varying obviously with the number of strands in the conveyer, since the greater the number of strands the greater the number of arrangements which can be made.

In Figures 1, 1$^a$, 2 and 3 we have illustrated single rollers 17 at the entrance and exit of the intermediate and the delivery stations, but in practice we prefer to employ a pair of rollers 17, 17$^a$ at each of these points in the manner illustrated at Figure 5. When a single roller is used the carrier cords sometimes shift from their proper grooves into an adjacent groove at the instant they are lifted out of the grooves by the passage of a message sheet or other article, resulting in twisted loops in the carrier cord which interfere with the operation of the conveyer; but by using a double roller arrangement at any or all points where single rollers are shown, one roller being above the cords and the other below, as a message sheet passes over a roller 17, lifting the overlying cords out of the grooves, these cords will be held in proper position and prevented from shifting by the fact that they remain in the grooves of the upper roller 17$^a$. The drive cords 35, of course, engage the under side of the grooves 31 in the upper rolls 17$^a$ and the under side of said grooves in the lower rollers 17. These drive cords relieve the carrier cords of all tension and pulling strains.

While it is preferable to construct the strands forming the conveyer of an endless cord yet this is not essential and the individual strands may be made of separate cords.

Having thus described the invention, what is claimed as new, is:

1. A conveyer system comprising a series of laterally spaced travelling strands normally moving in parallel paths, receiving and delivering stations, means at one side of each of said stations to separate certain strands from the remainder to form a shed or opening therebetween, means for restoring the strands to normal position at the other side of each station, and means for directing articles between said separated strands at the receiving stations and for diverting articles therefrom at the delivery stations.

2. A conveyer system comprising a series of laterally spaced strands travelling in the same plane arranged in warp like relation, receiving and delivering stations, means at one side of each of said stations to deflect selected strands away from the plane of travel of the remaining strands, means for restoring the strands to normal position at the other side of each station, and means for directing articles between said selected strands and other of said strands at the receiving stations and for diverting articles therefrom at the delivery stations.

3. A conveyer system comprising a series of conveyer rollers, strands travelling over said rollers in laterally spaced arrangement whereby the strands in travelling from one roller to the next normally lie in the same plane, and means between certain of adjacent rollers to deflect selected strands downwardly whereby to drop articles held between the deflected strands and the remaining strands.

4. A conveyer system comprising a series of grooved conveyer rollers, strands travelling in the grooves of said rollers in laterally spaced arrangement whereby the strands in travelling from one roller to the next normally lie in the same plane, means between certain of adjacent rollers to deflect selected strands downwardly whereby to drop articles held between the deflected strands and the remaining strands, and means to restore deflected strands to normal position on said rollers whereby an article may be gripped between the restored strands and the remaining strands.

5. A conveyer system comprising a series of conveyer rollers, strands travelling over said rollers in laterally spaced arrangement whereby the strands in travelling from one roller to the next normally lie in the same plane, means to deflect selected groups of said strands downwardly with the strands of one group spaced from the remaining groups, means to restore all the strands to a common plane, and loading chutes positioned between the groups of strands to deliver articles to the conveyer between said groups.

6. A conveyer system comprising a series of grooved rollers, carrier strands travelling in grooves in laterally spaced arrangement whereby the strands in travelling from one roller to the next normally lie in the same plane, means to deflect selected groups of said strands downwardly with the strands of one group spaced from the remaining groups, means to restore all of the strands to a common plane, and means to rotate the rollers and cause the movement of said carrier cords.

7. A conveyer system comprising a series of grooved conveyer rollers arranged in cooperative pairs, conveyer cords or strands in the grooves between said pairs of rollers in laterally spaced arrangement, means between certain adjacent pairs of rollers to deflect selected cords or strands downwardly whereby to drop articles held between the deflected cords or strands and the remaining strands, and means to restore the deflected strands to normal laterally spaced position between said pairs of rollers, whereby an article may be gripped and conveyed between the restored strands and the remaining strands.

In testimony whereof we affix our signatures.

HOBART MASON.
BRUCE BEARDSLEY.
PAUL J. BIRKMEYER.